Patented July 16, 1935

2,008,417

UNITED STATES PATENT OFFICE 2,008,417

PROCESS OF MANUFACTURING AN ARTIFICIAL RESIN

Frazier Groff, Bloomfield, N. J., assignor to Bakelite Corporation, New York, N. Y., a corporation of Delaware No Drawing. Application April 19, 1926, Serial No. 103,147

1 Claim. (Cl. 260—8)

This invention relates to a resinous composition resulting from the interaction of polyglycerols, phthalic anhydride, and a monobasic aliphatic or fatty acid of high molecular weight, or a mixture of such acids.

Resins have heretofore been prepared from glycerol and mixtures of phthalic anhydride with various mono- and di-basic acids of the aliphatic series, such for example as succinic, stearic, oleic acids, etc. Resins have also been prepared from polyglycerols and phthalic anhydride admixed with certain dibasic aliphatic acids.

My researches have disclosed unexpected and advantageous properties in resinous products resulting from the reaction of polyglycerols upon phthalic anhydride and saturated or unsaturated monobasic acids of the aliphatic series, such as oleic, linolic, linolenic, stearic, palmitic and similar acids of high molecular weight. These resins, and especially those derived from the unsaturated monobasic aliphatic acids of the type of oleic, linolic, and linolenic acid, are more readily prepared and harden more rapidly under the influence of heat, than similar resins made from glycerol: and they are more resistant to water than the corresponding resins prepared from polyglycerols, phthalic anhydride and succinic or other dibasic aliphatic acids.

The proportion of monobasic aliphatic acid added may be varied within rather wide limits, and by such variation the degree of flexibility of the varnish film may be controlled, the film being more flexible as the proportion of aliphatic or fatty acid is increased.

A typical resin embodying this invention is prepared as follows, it being understood that the invention is not restricted to the particular proportions or manipulations recited by way of example:

Glycerol admixed with 0.5% of caustic soda is heated under a reflux condenser to 240–290° C. for about 24 hours (or for a longer time at lower temperature) and converted thereby into a mixture of polyglycerols. One part of polyglycerols and one part of phthalic anhydride are melted together and one part of oleic acid is added. The resulting mixture is heated to 200° C.–250° C. with agitation until the solution becomes clear and remains clear on cooling. One part of phthalic anhydride is then added and the reaction continued at 200–250° C. until the product has almost reached the gel stage. The resin may be poured and cooled for use, or, for preparation of a varnish, solvents appropriate to the intended use are added.

The resinous product is reddish in color, and is rendered infusible and practically insoluble in ordinary solvents by continued heating at temperatures upward of 100° C. When prepared with relatively small proportions of oleic acid (5–10% by weight of the resin) the resin is hard on cooling and quite brittle. With larger proportions (up to about 50%) the cooled resin is rubbery, and with still higher proportions tends to become somewhat sticky but is still usable for certain purposes.

My preferred solvent for the resin is acetone, to which higher boiling solvents, such as ethyl acetate, di-ethyl phthalate, di-butyl phthalate, etc., are preferably added.

The resulting varnishes are applicable to a wide range of uses in the arts, and especially for the coating or impregnation of fibrous sheets (paper, woven fabric, leather, etc.) and as a dipping or spraying lacquer for metals. The varnish film is set and rendered insoluble by baking, say from two to five hours at 100°–180° C. The impregnated papers or fabrics are well suited for insulating purposes in the electrical field, as gasket materials, etc. The resin may also be mixed with filling materials such as wood flour, asbestos, etc., and molded under heat and pressure, the molded articles being thereafter baked if desired to improve their strength, resistance to the action of water, and other mechanical qualities.

I claim:

Method of preparing resinous products of the glycerol type characterized by flexibility and solubility in acetone which comprises melting a polyglycerol with an approximately equal part by weight of phthalic anhydride and with a monobasic fatty acid, heating the mixture with agitation until a clear solution is obtained, adding another part of phthalic anhydride, reacting the mixture almost to the gel stage, and then arresting the reaction.

FRAZIER GROFF.